(12) United States Patent
Boyer, Jr.

(10) Patent No.: US 12,358,604 B2
(45) Date of Patent: Jul. 15, 2025

(54) AIRCRAFT CARGO DOOR SHIELD

(71) Applicant: William J. Boyer, Jr., Lakewood, WA (US)

(72) Inventor: William J. Boyer, Jr., Lakewood, WA (US)

(73) Assignee: B&J IP, LLC, Universal City, TX (US)

( * ) Notice: Subject to any disclaimer, the term of this patent is extended or adjusted under 35 U.S.C. 154(b) by 55 days.

(21) Appl. No.: 18/451,588

(22) Filed: Aug. 17, 2023

(65) Prior Publication Data

US 2024/0059391 A1 Feb. 22, 2024

Related U.S. Application Data

(60) Provisional application No. 63/428,381, filed on Nov. 28, 2022, provisional application No. 63/399,177, filed on Aug. 18, 2022.

(51) Int. Cl.
*B64C 1/14* (2006.01)

(52) U.S. Cl.
CPC .................. *B64C 1/1415* (2013.01)

(58) Field of Classification Search
CPC ....... B64C 1/1415; B64C 1/1461; B64C 1/22; B60R 13/043
See application file for complete search history.

(56) References Cited

U.S. PATENT DOCUMENTS

| 5,520,358 | A  | * | 5/1996  | Kahn ....................... B64C 1/14 49/40 |
| 8,109,557 | B1 | * | 2/2012  | Salinas ..................... F41H 5/16 296/97.23 |
| 9,108,717 | B2 | * | 8/2015  | Boyer, Jr. ............. B64C 1/1415 |
| 9,611,028 | B2 | * | 4/2017  | Boyer ................... B64C 1/1446 |
| 9,945,173 | B2 | * | 4/2018  | Boyer, Jr. ............... E06B 3/308 |
| 2011/0121135 | A1 | * | 5/2011  | Maguire ................... B64F 1/32 244/121 |
| 2015/0082708 | A1 | * | 3/2015  | Eilken ...................... B64C 1/14 49/477.1 |
| 2023/0365272 | A1 | * | 11/2023 | Boyer, Jr. ............... B64F 1/005 |

* cited by examiner

*Primary Examiner* — Magdalena Topolski
(74) *Attorney, Agent, or Firm* — Perkins Coie LLP

(57) ABSTRACT

A cargo door shield system for a cargo bay door in an aircraft used to prevent the exterior surface of the cargo bay door from being damaged by objects moving through the cargo bay door during loading and unloading of the aircraft.

20 Claims, 7 Drawing Sheets

AIRCRAFT CARGO DOOR SHIELD

CROSS-REFERENCE TO RELATED APPLICATIONS

This non-provisional patent application claims the benefit of and priority to U.S. Provisional Patent Application No. 63/399,177, titled Aircraft Cargo Door Shield, filed Aug. 18, 2022, and U.S. Provisional Patent Application No. 63/428,381, titled Aircraft Cargo Door Shield, filed Nov. 28, 2022, both of which are incorporated herein in their entirety by reference thereto.

TECHNICAL FIELD

The application relates to a door shield for an aircraft cargo door.

BACKGROUND

Cargo doors of some aircraft are typically hinged at the top to the airframe adjacent to a cargo doorway. When opened, the door is rotated inward and toward the ceiling of the cargo bay, such that the exterior skin of the cargo door faces downward toward the floor of the cargo bay. The cargo bay is where luggage and other types of cargo (hereinafter both being referred to as "cargo") are placed for transport with the aircraft. When cargo is being loaded into or unloaded from the cargo bay, due to the limited height of the cargo bay, the cargo passes under the exterior skin of the opened cargo door. If excessive contact between the open cargo door and the cargo or loading/unloading equipment, the door's exterior skin is at risk of being damaged, which could require repair and/or take the aircraft out of service.

BRIEF DESCRIPTION OF THE DRAWINGS

Features, aspects, and advantages of the presently disclosed technology may be better understood with regard to the following drawings.

Figure 1:
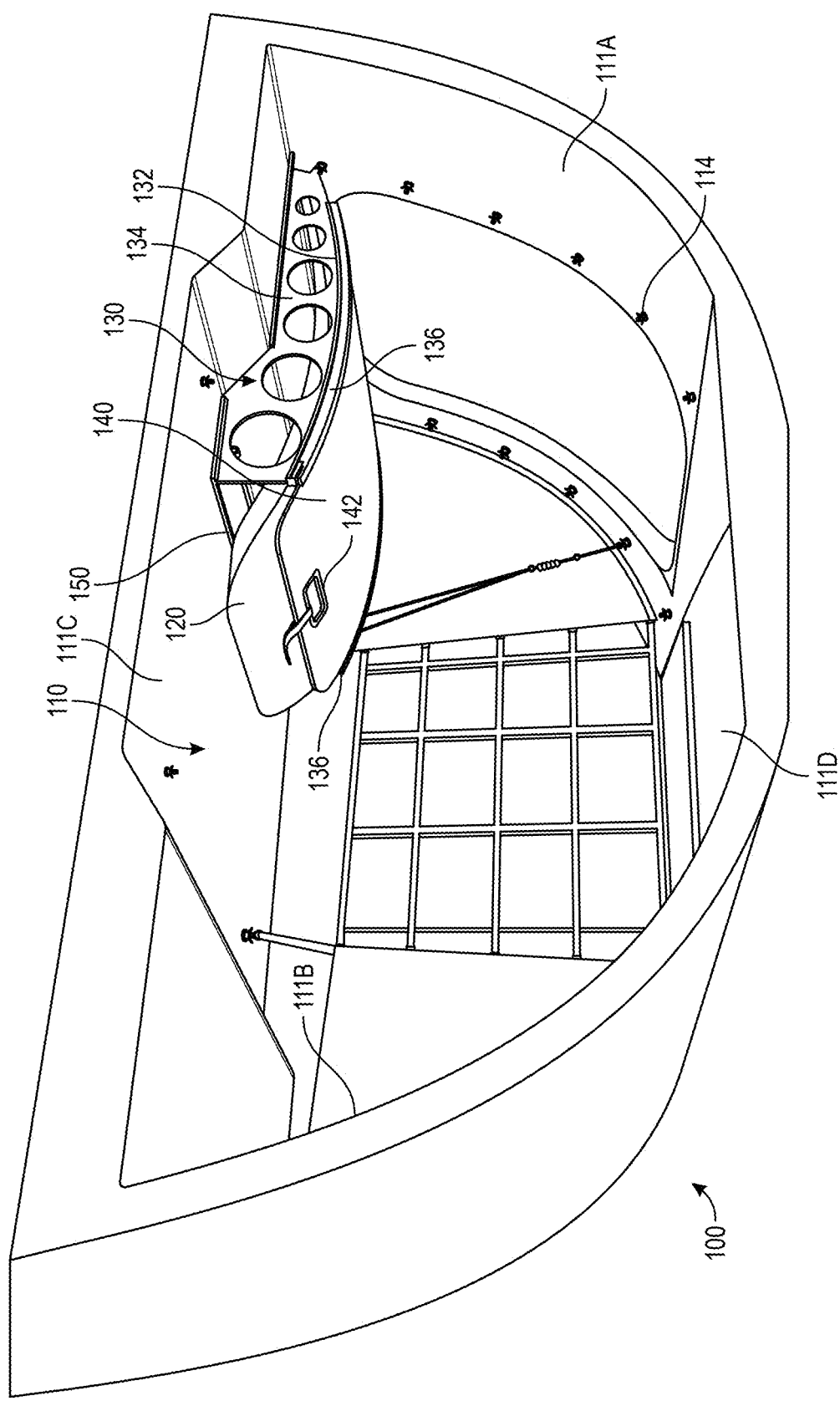
FIG. 1 is a perspective view of an aircraft cargo door shield assembly adjacent to an aircraft's open cargo bay door and a door shield system is in an installed configuration to protect the cargo door, in accordance with embodiments of the present technology.

A person skilled in the relevant art will understand that the features shown in the drawings are for purposes of illustration, and variations, including different and/or additional features and arrangements thereof, are possible.

DETAILED DESCRIPTION

The present technology is directed to a cargo door shield system for an aircraft and associated systems and methods. Several embodiments of the present technology are related to a cargo door shield system attachable to the perimeter of the cargo bay doorway and/or ceiling of the cargo bay. The cargo door shield system can have a removable door shield that can be installed into and removed from side guide system positioned to be adjacent to the aircraft's cargo door when in the open position. When the cargo door is open, the door is positioned between two side guides mounted within the cargo bay. Each of the side guides has an attachment feature which, mateably engages the door shield in an installed position, so as to cover and protect the cargo door as cargo is loaded into or out of the cargo bay. The door shield can be disengaged from the attachment features and removed from the side guide system to uncover the cargo door so as to allow the cargo door to be closed. The door shield can be removed from the cargo bay and stored externally of the aircraft (e.g., in a storage location at an airport) or within the cargo bay or other location in the aircraft.

At least one embodiment of the present technology provides a cargo door shield system for protecting a cargo bay door of a cargo bay inside an aircraft fuselage. The system has first and second side guides and a cargo door shield. The first side guide is coupled to an upper cargo-bay structure adjacent to a cargo bay opening in the aircraft fuselage, and the first side guide has a first attachment feature. The second side guide is coupled to the upper cargo-bay structure adjacent to the cargo bay opening and has a second attachment feature. The first and second side guides are spaced apart from each other and do not impede the cargo bay door from moving relative to the fuselage between open and closed positions. The cargo door shield is moveable between installed and removed positions, wherein the cargo door shield is coupled to the first and second attachment features and contoured to cover at least a portion of an exterior surface of the cargo bay door when in the installed position. The cargo door shield is decoupled from the first and second attachment features and does not impede the cargo bay door from moving relative to the fuselage between the open and closed positions when in the removed position.

Another embodiment of the present technology provides a cargo door shield system for protecting a cargo bay door of a cargo bay inside an aircraft. The system has first and second fixtures and a panel. The first fixture has a first attachment feature, and the second fixture has a second attachment feature, wherein the first and second fixtures do not impede the cargo bay door from moving between open and closed positions. The panel is moveable between installed and removed positions. The panel is coupled to the first and second fixtures and contoured to cover at least a portion of an exterior surface of the cargo bay door when the cargo bay door is in the open position and the panel is in the installed position. The panel is decoupled from the first and second fixtures and does not impede the cargo bay door from moving between the open and closed positions when the panel is in the removed position.

Another embodiment of the present technology provides a method of protecting a cargo bay door of a cargo bay inside an aircraft. The method includes coupling a first side guide and a second side guide in a cargo bay adjacent to a perimeter portion of a cargo bay opening, wherein the first and second side guides do not impede the cargo bay door from moving between open and closed positions relative to the cargo bay opening. The method also includes moving the cargo bay door relative to the cargo bay opening from the closed position to the open position, and removably positioning a cargo door shield in an installed position wherein the cargo door shield is removably coupled to a first attachment feature of the first side guide and to a second attachment feature of the second side guide with the cargo door shield spanning between the first and second side guides and covering the cargo bay door when the cargo bay door is in the open position.

Specific details of the present technology are described herein with reference to FIGS. 1-7. Although many of the embodiments are described with respect to cargo bay systems for aircrafts, it should be noted that other applications and embodiments in addition to those disclosed herein are within the scope of the present technology. Further, embodiments of the present technology can have different configurations, components, and/or procedures than those shown or described herein. Moreover, a person of ordinary skill in the art will understand that embodiments of the present technology can have configurations, components, and/or procedures in addition to those shown or described herein and that these and other embodiments can be without several of the configurations, components, and/or procedures shown or described herein without deviating from the present technology.

Figure 2:
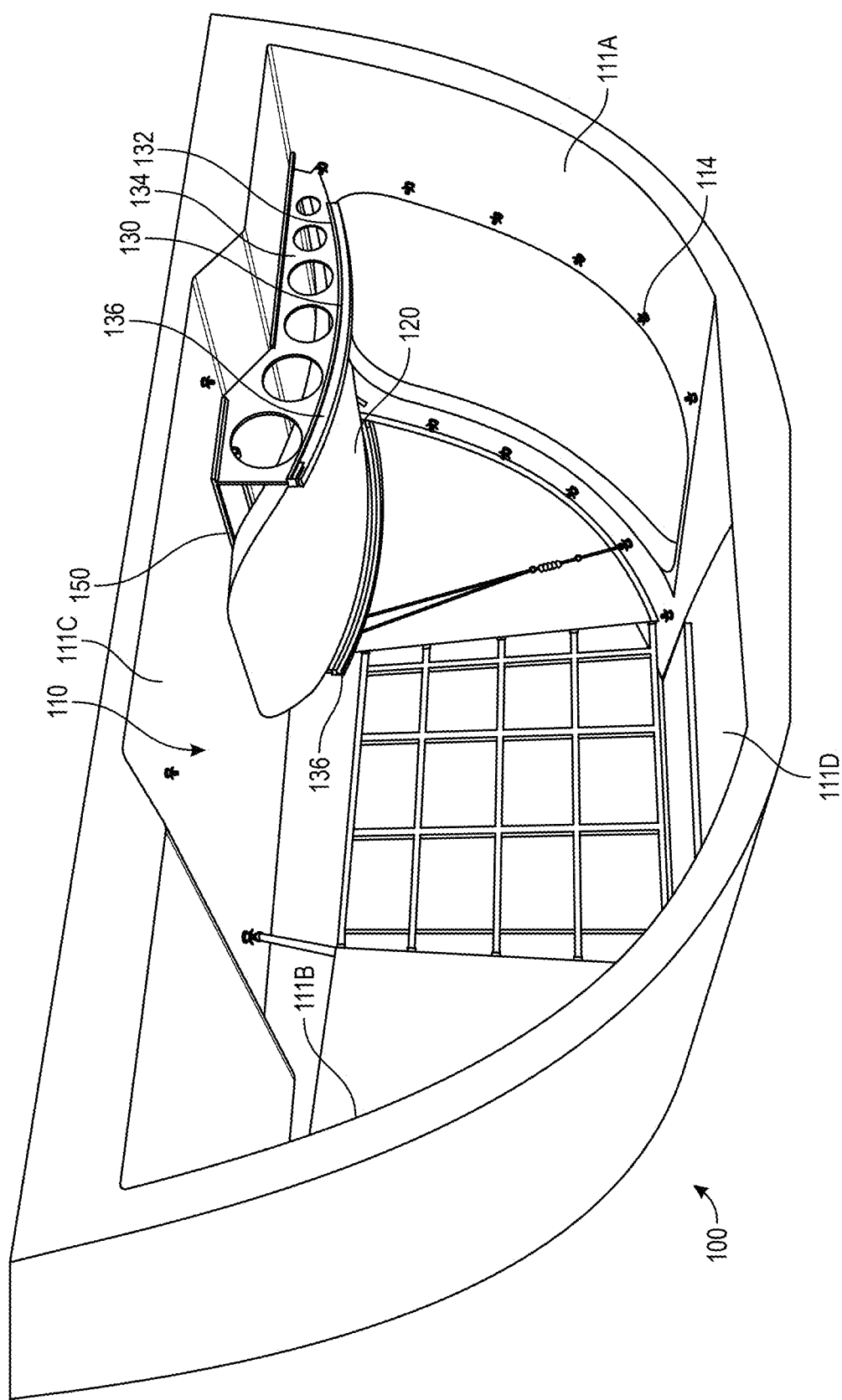
FIG. 2 is a perspective view of the aircraft cargo door shield assembly of FIG. 1 when the cargo bay door is open and the door shield is removed from the side guide system adjacent to the open cargo door in accordance with embodiments of the present technology.
Figure 3:
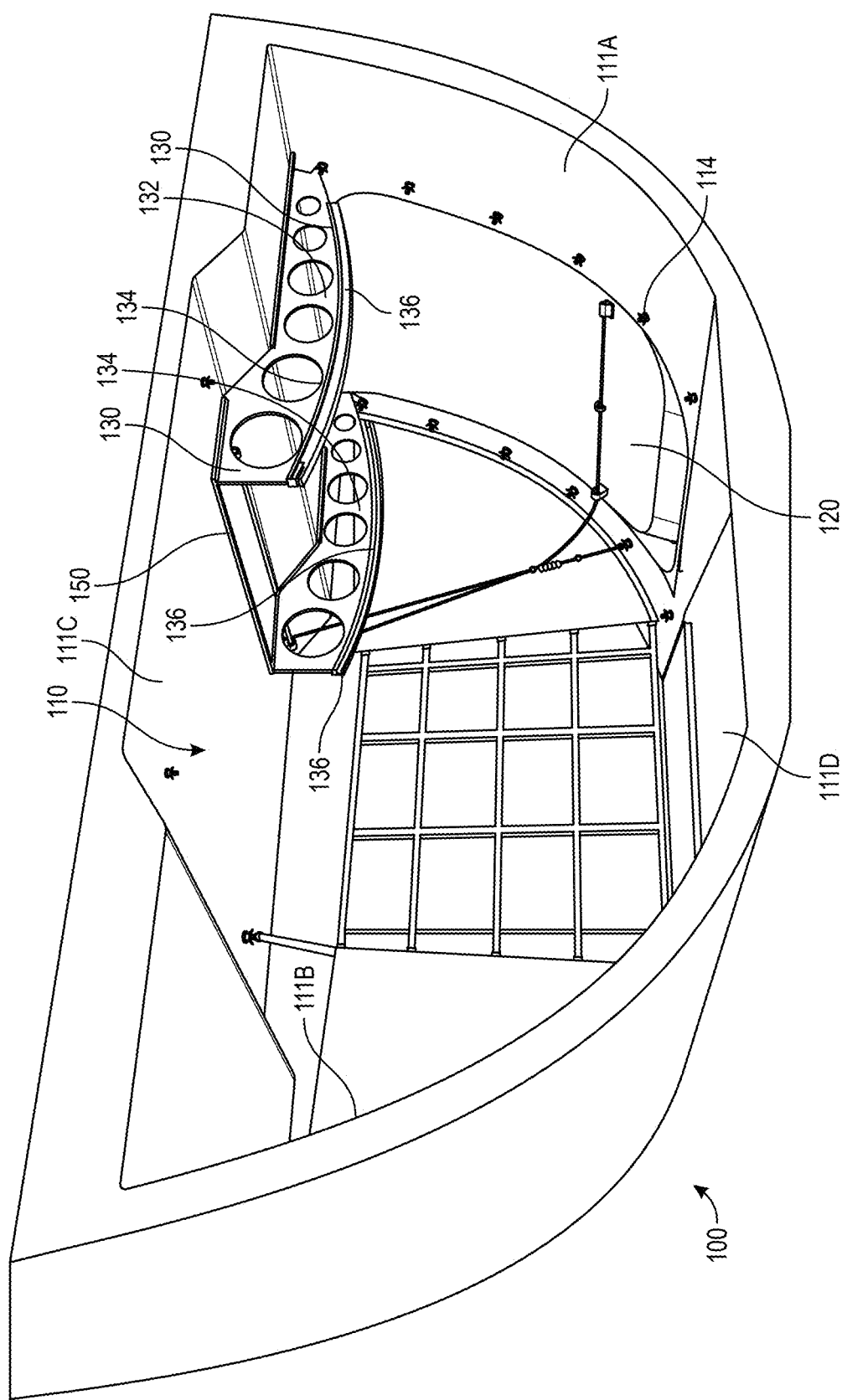
FIG. 3 is a perspective view of the aircraft cargo door shield assembly of FIG. 1 with the cargo door closed and the door shield removed from the side guide system.
Figure 4:
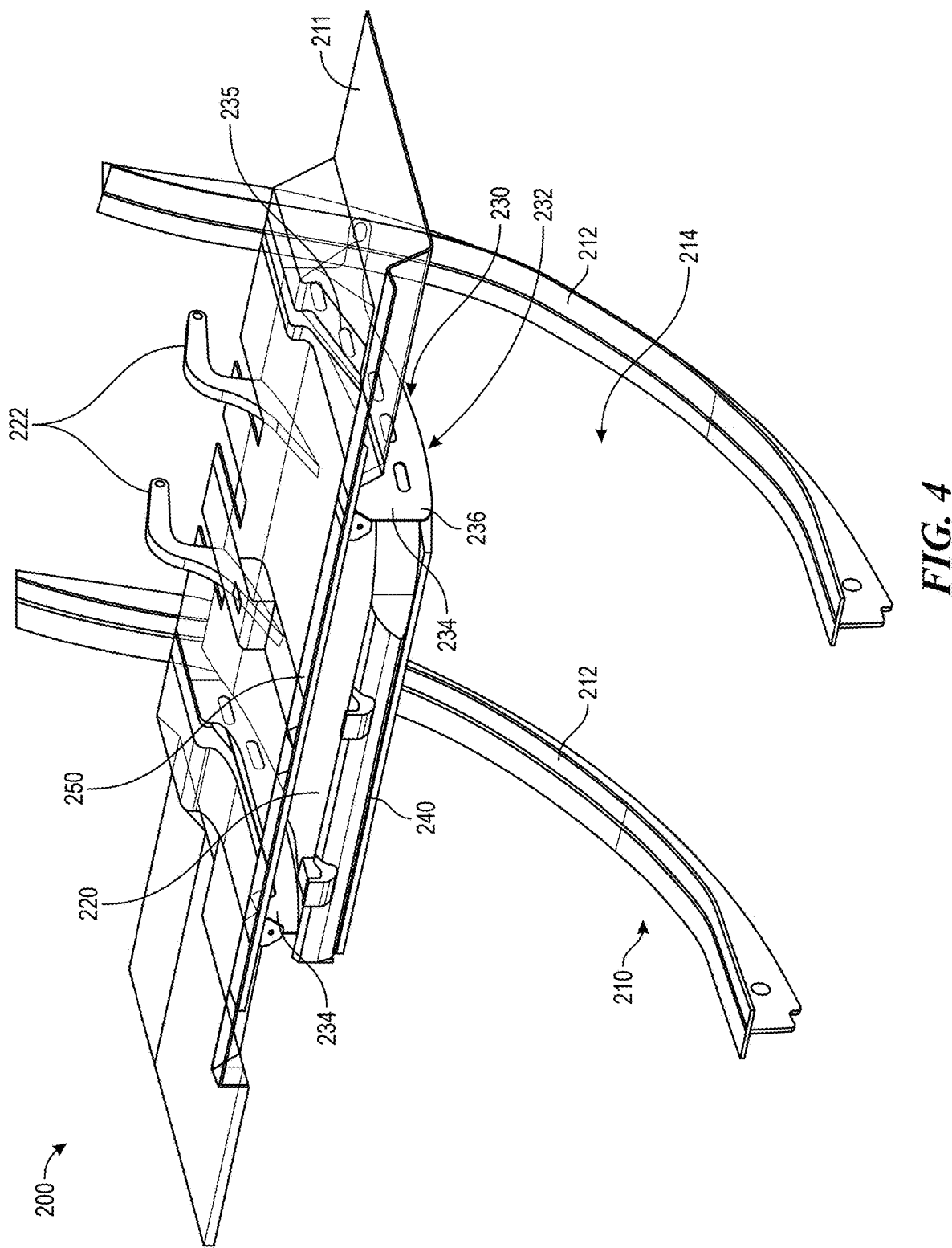
FIG. 4 is a top perspective view of an aircraft cargo door shield assembly adjacent to an aircraft's open cargo bay door, and a door shield system is in an installed configuration to protect the cargo door, in accordance with embodiments of the present technology. The aircraft's fuselage is not shown for purposes of illustration.
Figure 5:
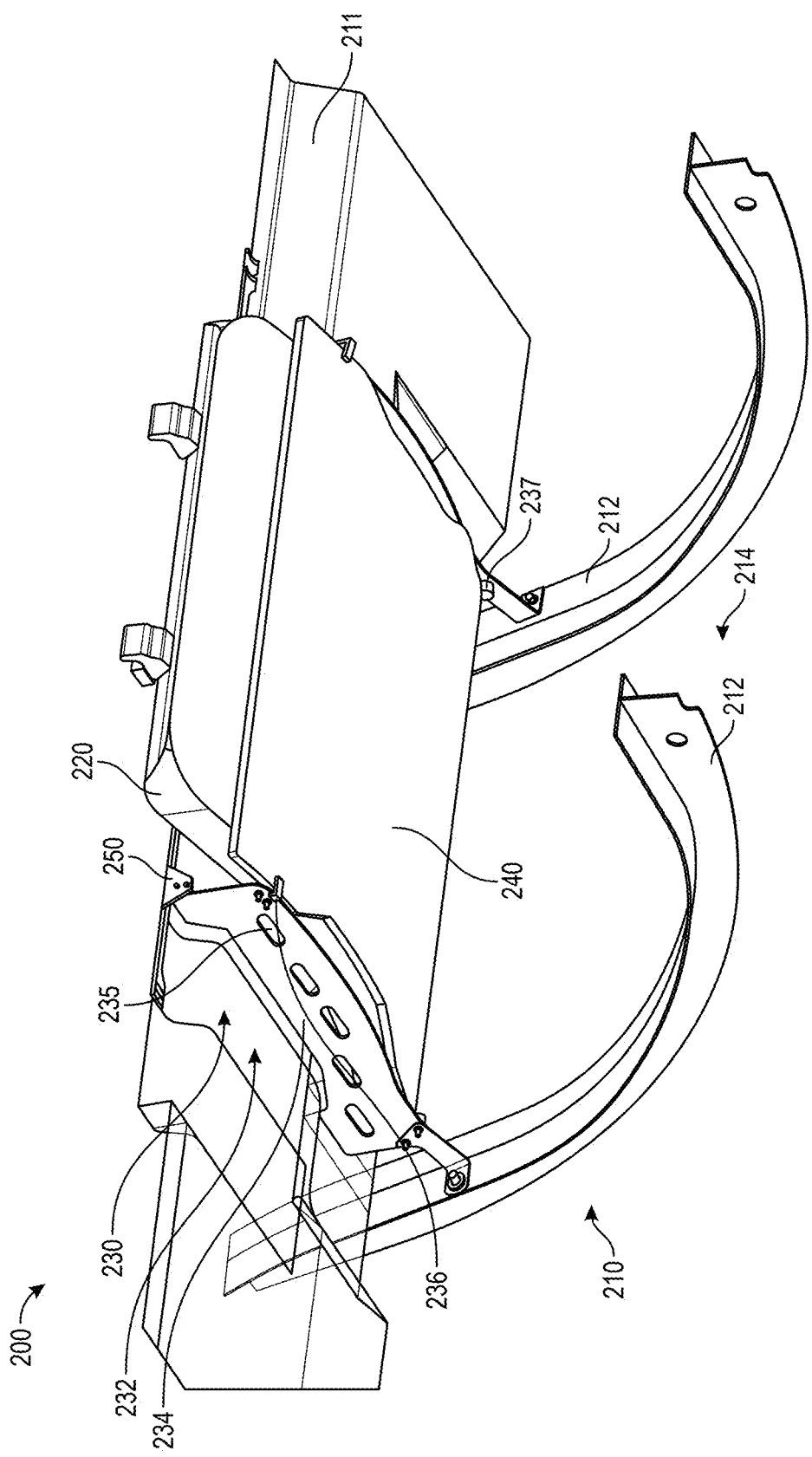
FIG. 5 is a bottom perspective view of the aircraft cargo door shield assembly of FIG. 4.
Figure 6:
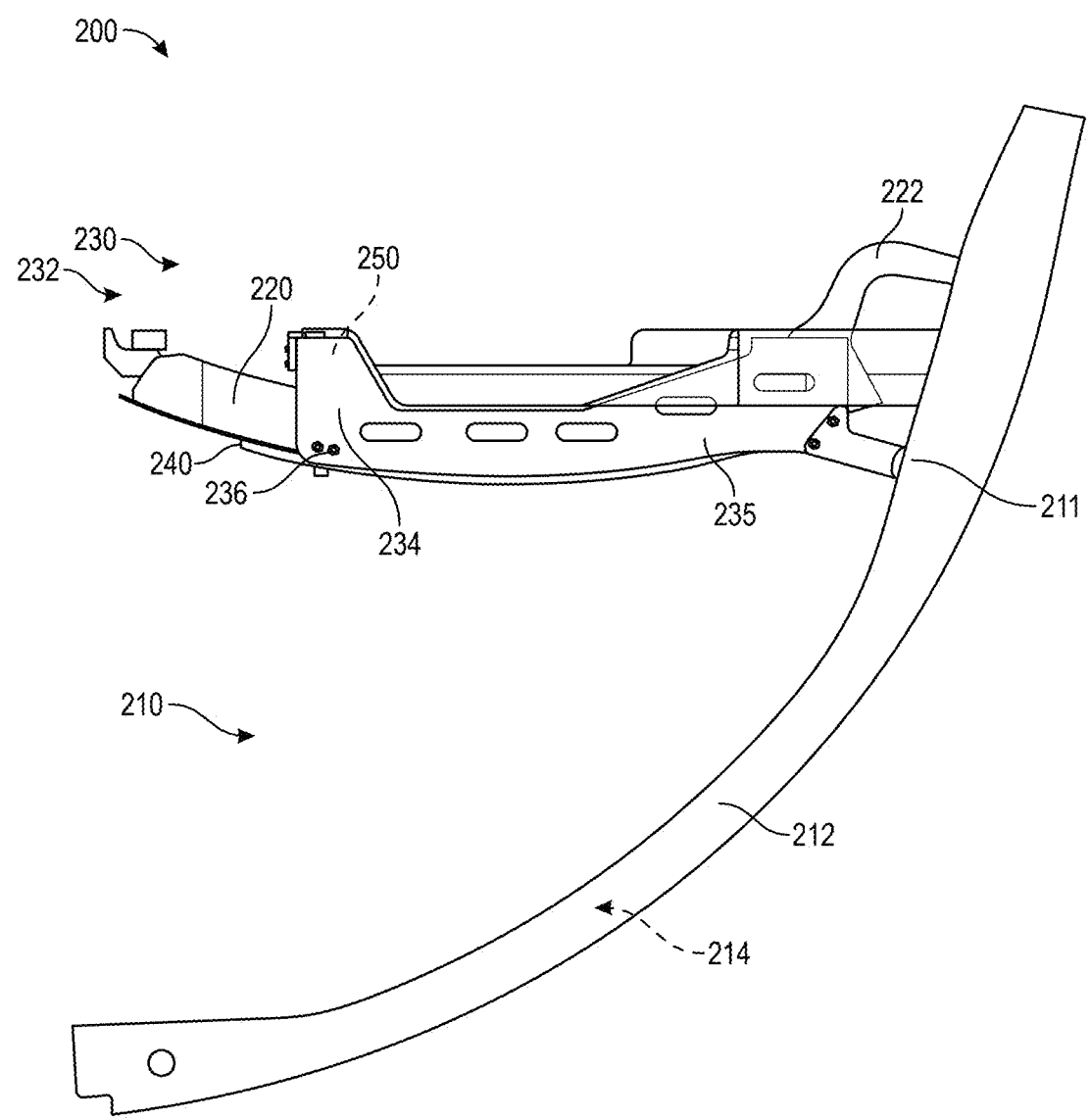
FIG. 6 is a side view of the aircraft cargo door shield assembly of FIG. 4.
Figure 7:
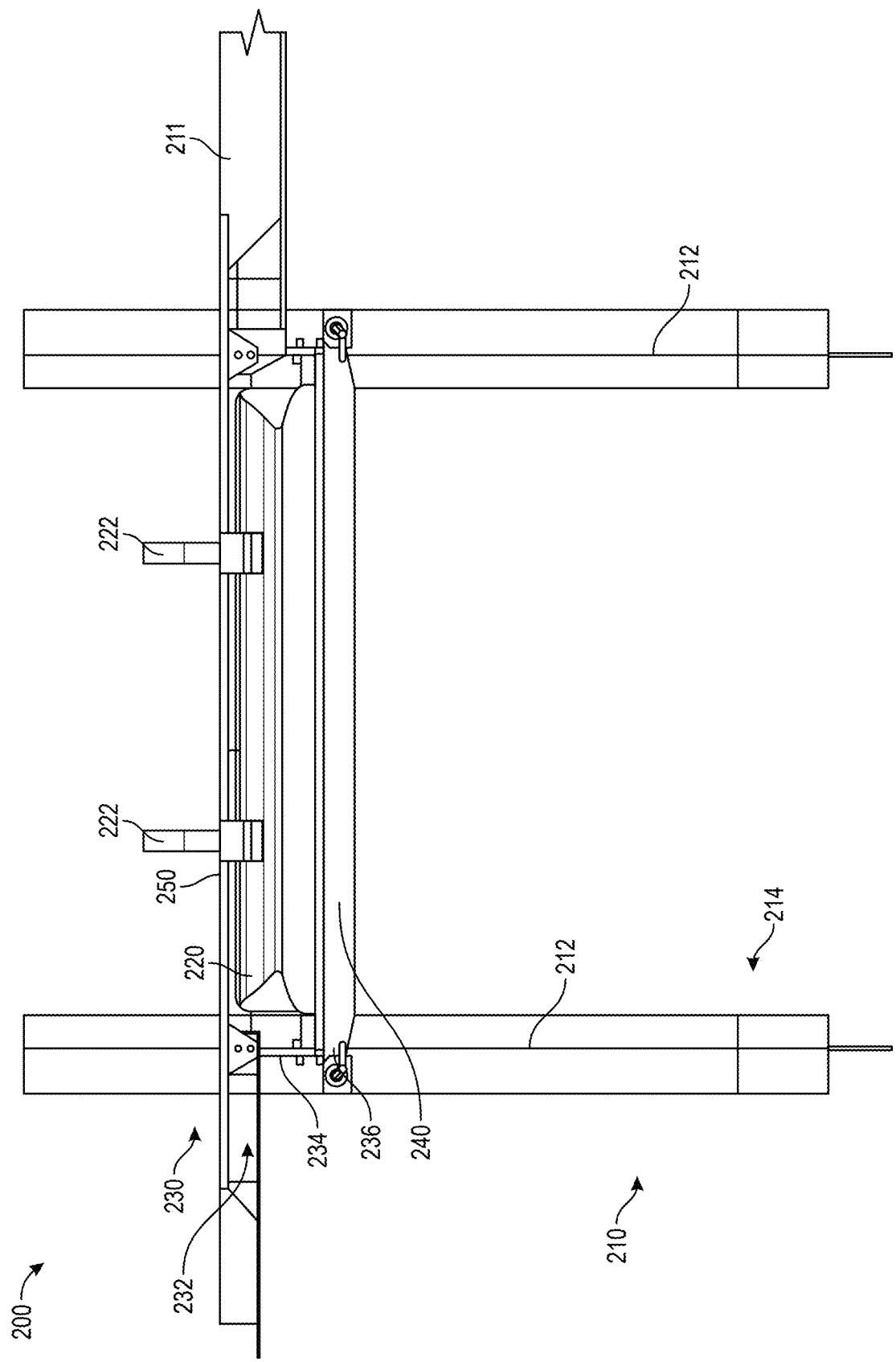
FIG. 7 is a plan view of the aircraft cargo door shield assembly of FIG. 4 from inside of a cargo bay.

FIGS. 1-3 show interior perspective views of a cargo bay 110 of an aircraft 100 of an embodiment of the present technology. The cargo bay 110 has first and second sidewalls 111A and 111B, a ceiling 111C, and a cargo bay floor 111D on which cargo rests when in the cargo bay. To access the cargo bay 110 from outside of the aircraft 100, the aircraft 100 includes a cargo door 120 sealably positioned within a portal or doorway 114. The cargo door 120 is hinged at its top portion and movable between an open position (FIGS. 1 and 2) and a closed position (FIG. 3).

A cargo door shield system 130 is provided in the cargo bay 110 to protect the cargo door 120 when the cargo door is open and cargo is being loaded into or out of the cargo bay. The cargo door shield system 130 of the illustrated embodiment has a side guide system 132 with a pair of spaced-apart side guides 134. The cargo door shield system 130 also has a cross bar 150 attached to the ceiling 111C and to each of the side guides 134 adjacent to the cargo door 120. The side guides 134 are positioned so that, when the cargo door 120 is in the open position (FIGS. 1 and 2), the side guides 134 are positioned on opposing sides of the cargo door. The side guides 134 do not interfere with movement of the cargo door 120 between the open and closed positions.

In the illustrated embodiment, the top portion of the side guides 134 can be contoured to match the contours of the ceiling 111C adjacent to the cargo door 120. The side guides 134 can also include apertures or other cutouts so as to reduce the material forming the rails, thereby reducing the weight of the side guide system 132 without detracting from the structural integrity of the side guide system 132.

The bottom portion of each side guide 134 has a curved or contoured shape that generally corresponds to the curvature or contour of the cargo door 120. Each side guide 134 has a rail 136 along the bottom portion. The side guides 134 are configured to removably receive a door shield 140 (FIG. 1) within the rails when the cargo door 120 is in the open position. The door shield 140 is made of a very durable material that can absorb impacts and protect the cargo door 120 from damage. The door shield 140 can be slid into the rails 136 to a fully installed position, so as to cover and protect the open cargo door 120. The door shield 140 has an access handle 142 formed in or attached to the lower end that a user can grasp to install or remove the door shield from the side guides 134. The door shield 140 can be slid out of the side guides 134 to a removed position separated from the side guide system 132, so as to expose the cargo door 120 (FIG. 2) and allow the door to be moved between the open and closed positions.

The door shield 140 can be contoured, as well as being flexible so as to follow the shape of the rails 136 of the side guides 134, while still having sufficient rigidity to remain in the rails 136 and spanning between the side guides 134 when in the installed position. When the door shield 140 is moved to the removed position, the door shield 140 can be removed from the cargo bay 110 before the cargo door 120 is closed. The removed door shield 140 can be stored at a suitable location exterior to the aircraft. In other embodiments, the cargo bay 110 could be provided with a storage area into which the door shield can be positioned before the cargo door 120 is closed. Accordingly, the door shield 140 may travel with the aircraft. In other embodiments, each of the rails 136 can instead be a single protrusion that extends along the length of the side guide 134 and vertically supports the weight of the door shield 140. In other embodiments, multiple door shield systems 130 with the side guides 134 and the door shield 140 can have a common shape and configurations, so that a door shield can be used on any aircraft in a fleet fitted with the door shield system 130. Further, if a door shield 140 is damaged, it can be quickly and easily replaced without having to fix the aircraft or take the aircraft out of service.

FIGS. 4-7 show various views of a cargo bay 210 of an aircraft 200 of an embodiment of the present technology. The cargo bay 210 has a ceiling 211 and a pair of doorway struts 212 positioned on either side of a doorway 214. To access the cargo bay 210 from outside of the aircraft 200, the aircraft 200 includes a cargo door 220 sealably positioned within the doorway 214. The cargo door 220 is hinged at its top portion 222 and movable between an open position (FIGS. 4-7) and a closed position (not shown, but analogous to FIG. 3).

A cargo door shield system 230 is provided in the cargo bay 210 to protect the cargo door 220 when the cargo door is open and cargo is being loaded into or out of the cargo bay 210. The cargo door shield system 230 of the illustrated embodiment has a side guide system 232 with a pair of spaced-apart side guides 234 mounted to the pair of doorway struts 212. The cargo door shield system 230 also has a cross bar 250 attached to the ceiling 211 adjacent to the cargo door 220 and to the side guides 234. The side guides 234 are positioned so that, when the cargo door 220 is in the open position, the side guides 234 are positioned on opposing sides of the cargo door 220. The side guides 234 do not interfere with movement of the cargo door 220 between the open and closed positions.

In the illustrated embodiment, the top portion of the side guides 234 can be contoured to match the contours of the ceiling 211 adjacent to the cargo door 220. The side guides 234 can also include apertures or other cutouts 235 so as to reduce the material forming the rails, thereby reducing the weight of the side guide system 232 without detracting from the structural integrity of the side guide system 232.

The bottom portion of each side guide 234 has a curved or contoured shape that generally corresponds to the curvature or contour of the cargo door 220. Each side guide 234 has one or more shield-retention members, such as a quarter-turn fastener 236 and a protrusion 237 (FIG. 5) along the bottom portion. The quarter-turn fasteners 236 and the protrusions 237 are configured to couple the door shield 240 to the side guides 234 when the cargo door 220 is in the open position. In other embodiments, the shield-retention members can be other retaining members, such as clips, snaps, hooks, magnets, hooks-and-loop connectors (e.g., Velcro®), etc., configured to releasably engage and/or retain the door shield 240 on the side guides 234 to cover and/or protect the open cargo door from impact by cargo, cargo-handling equipment, or other impacts. The door shield 240 is made of a very durable material that can absorb impacts and protect the cargo door 220 from damage. The door shield 240 can be removably coupled to the side guides 234 via the shield-retention members, such as the quarter-turn fasteners 236 and the protrusions 237 in an installed position, so as to cover and protect the open cargo door 220. In some embodiments the quarter-turn fasteners 236 and/or the protrusions 237 can form or be positioned adjacent to tracks in the side guides 234 that receive edge portions of the door shield 240. In some embodiments, the door shield 240 can have an access handle formed in or attached to the lower end that a user can grasp to install or remove the door shield from the side guides 234.

The door shield 240 can be decoupled from the side guides 234 to a removed position separated from the side guide system 232, so as to expose the cargo door 220 and allow the door to be moved between the open and closed positions. When the door shield 240 is moved to the removed position, the door shield 40 can be removed from the cargo bay 210 before the cargo door 220 is closed. The removed door shield 240 can be stored at a suitable location exterior to the aircraft. In other embodiments, the cargo bay 210 could be provided with a storage area into which the door shield can be positioned before the cargo door 220 is closed. Accordingly, the door shield 240 may travel with the aircraft.

From the foregoing, it will be appreciated that specific embodiments of the invention have been described herein for purposes of illustration, but that various modifications may be made without deviating from the scope of the invention. Accordingly, the invention is not limited except as by the appended claims.

It will be apparent to those having skill in the art that changes may be made to the details of the above-described embodiments without departing from the underlying principles of the present disclosure. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. Additionally, the term "comprising," "including," and "having" should be interpreted to mean including at least the recited feature(s) such that any greater number of the same feature and/or additional types of other features are not precluded.

Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

I claim:

1. A cargo door shield system for protecting a cargo bay door of a cargo bay inside an aircraft fuselage, comprising:
    a first side guide coupled to an upper cargo-bay structure adjacent to a cargo bay opening in the aircraft fuselage, the first side guide having a first attachment feature;
    a second side guide coupled to the upper cargo-bay structure adjacent to the cargo bay opening and having a second attachment feature, wherein the first and second side guides are spaced apart from each other and do not impede the cargo bay door from moving relative to the fuselage between open and closed positions; and
    a cargo door shield moveable between installed and removed positions, wherein the cargo door shield is coupled to the first and second attachment features and contoured to cover at least a portion of an exterior surface of the cargo bay door when in the installed position, and wherein the cargo door shield is decoupled from the first and second attachment features and does not impede the cargo bay door from moving relative to the fuselage between the open and closed positions when in the removed position.

2. The cargo door shield system of claim 1 wherein the first attachment feature comprises a first rail and the second attachment feature comprises a second rail, wherein the first and second rails are configured to hold the side portions of the cargo door shield to cover and protect the cargo bay door when in the open position.

3. The cargo door shield system of claim 1 wherein the first attachment feature comprises a first protrusion and the second attachment feature comprises a second protrusion, wherein the first and second protrusions are configured to vertically support side portions of the cargo door shield to cover and protect the cargo bay door when in the open position.

4. The cargo door shield system of claim 1 wherein the first attachment feature comprises first fasteners and the second attachment feature comprises second fasteners, wherein the first and second fasteners are configured to removably attach the cargo door shield to the first and second side guides, respectively.

5. The cargo door shield system of claim 1 further comprising a cross bar coupled to a ceiling portion of the cargo bay and to the first and second side guides.

6. The cargo door shield system of claim 1 wherein top portions of the first and second side guides are contoured to match contours of upper cargo-bay structure of the cargo bay.

7. The cargo door shield system of claim 1 wherein the cargo door shield is configured to be separated from the first and second side guides and physically removed from the cargo area when the cargo bay door is in the closed position.

8. The cargo door shield system of claim 1 wherein the cargo door shield comprises a flexible and durable material.

9. The cargo door shield system of claim 1 wherein the cargo door shield comprises at least one of a handle and/or a strap configured to assist a user in moving the cargo door shield between the installed and removed positions.

10. A cargo door shield system for protecting a cargo bay door of a cargo bay inside an aircraft, comprising:
a first fixture having a first attachment feature;
a second fixture having a second attachment feature, wherein the first and second fixtures do not impede the cargo bay door from moving between open and closed positions; and
a panel moveable between installed and removed positions, wherein the panel is coupled to the first and second fixtures and contoured to cover at least a portion of an exterior surface of the cargo bay door when the cargo bay door is in the open position and the panel is in the installed position, and wherein the panel is decoupled from the first and second fixtures and does not impede the cargo bay door from moving between the open and closed positions when the panel is in the removed position.

11. The cargo door shield system of claim 10 wherein the first attachment feature comprises a first rail and the second attachment feature comprises a second rail, and wherein the first and second rails are configured to slidably engage side portions of the panel.

12. The cargo door shield system of claim 10 wherein the first attachment feature comprises first fasteners and the second attachment feature comprises second fasteners, wherein the first and second fasteners are configured to removably attach the panel to the first and second fixtures, respectively.

13. A method of protecting a cargo bay door of a cargo bay inside an aircraft, comprising:
coupling a first side guide and a second side guide in a cargo bay adjacent to a perimeter portion of a cargo bay opening, wherein the first and second side guides do not impede the cargo bay door from moving between open and closed positions relative to the cargo bay opening;
moving the cargo bay door relative to the cargo bay opening from the closed position to the open position;
removably positioning a cargo door shield in an installed position wherein the cargo door shield is removably coupled to a first attachment feature of the first side guide and to a second attachment feature of the second side guide with the cargo door shield spanning between the first and second side guides and covering the cargo bay door when the cargo bay door is in the open position.

14. The method of claim 13 wherein the first attachment feature comprises a first rail and the second attachment feature comprises a second rail, and wherein positioning the cargo door shield in the installed position includes positioning edges of the cargo door shield in the first and second rails to hold the cargo door shield adjacent to the cargo bay door in the open position.

15. The method of claim 13 wherein the first attachment feature comprises a first protrusion and the second attachment feature comprises a second protrusion, wherein positioning the cargo door shield in the installed position includes supporting the cargo door shield by the first and second protrusions to hold the cargo door shield adjacent to the cargo bay door in the open position.

16. The method of claim 13 wherein the first attachment feature comprises a first set of fasteners and the second attachment feature comprises a second set of fasteners, wherein positioning the cargo door shield in the installed position includes supporting the cargo door shield by the first and second fasteners to hold the cargo door shield adjacent to the cargo bay door in the open position.

17. The method of claim 13 further comprising coupling a cross bar to a ceiling portion of the cargo bay and to the first and second side guides.

18. The method of claim 13 further comprising:
removing the cargo door shield from the first and second side guides;
moving the removed cargo door shield to a remote location away from the cargo bay door; and
moving the cargo bay door from the open position to the closed position.

19. The method of claim 18 wherein moving the removed cargo door shield to a remote location comprising moving the removed cargo door shield to a location exterior of the cargo bay.

20. The method of claim 18 wherein moving the removed cargo door shield to a remote location comprising moving the removed cargo door shield to a location within the cargo bay away from the cargo bay door and away from the first and second side guides.

* * * * *